United States Patent
Hsu et al.

(10) Patent No.: US 6,346,978 B1
(45) Date of Patent: Feb. 12, 2002

(54) SOI TFT ARRAY SUBSTRATE FOR LCD PROJECTION DISPLAY

(75) Inventors: Sheng Teng Hsu, Camas; Jon Allen Shroyer, Vancouver, both of WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/352,458

(22) Filed: Jul. 13, 1999

(51) Int. Cl.[7] .............................................. G02F 1/1333
(52) U.S. Cl. ........................................ 349/160; 349/138
(58) Field of Search ........................... 349/43, 42, 160, 349/138; 430/30

(56) References Cited

U.S. PATENT DOCUMENTS

| | | | |
|---|---|---|---|
| 5,434,433 A | * 7/1995 | Takasu et al. | 257/59 |
| 5,436,175 A | 7/1995 | Nakato et al. | 437/24 |
| 5,468,657 A | 11/1995 | Hsu | 437/24 |
| 5,530,266 A | * 6/1996 | Yonehara et al. | 257/72 |
| 5,714,790 A | * 2/1998 | Sakamoto | 257/440 |
| 5,773,355 A | * 6/1998 | Inoue et al. | 438/459 |
| 6,128,052 A | * 10/2000 | Asaba et al. | 349/42 |
| 6,157,421 A | * 12/2000 | Ishii | 349/43 |

\* cited by examiner

Primary Examiner—Toan Ton
Assistant Examiner—Andrew Schechter
(74) Attorney, Agent, or Firm—David C. Ripma; Mathew D. Rabdau; Scott C. Krieger

(57) ABSTRACT

The invention provides a substrate and high-density pixel array for use in liquid crystal displays (LCDs). The pixels are formed using integrated circuit (IC) processes on silicon-on-insulator (SOI) substrates and include thin film transistors (TFTs) formed in single-crystal silicon. Instead of bonding a layer of single-crystal silicon to a separate transparent substrate made of glass, quartz, or another transparent material, or partially crystallizing silicon deposited on a substrate, the invention employs a unitary SOI wafer substrate having a buried insulating layer of silicon dioxide. A high-density pixel array comprising rows and columns of pixel electrodes, each controlled by a TFT, is formed in the surface layer of the substrate. The bulk silicon supporting layer, beneath the pixel array, on the opposite side of the insulating layer of the substrate, is removed. The resultant substrate includes a pixel array and a supporting layer of silicon dioxide.

5 Claims, 7 Drawing Sheets

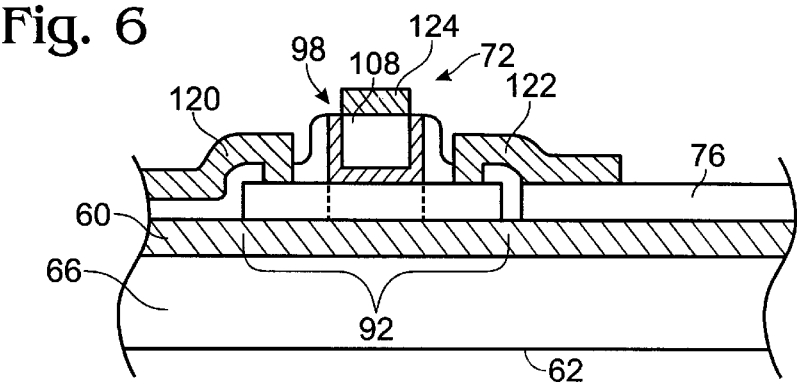
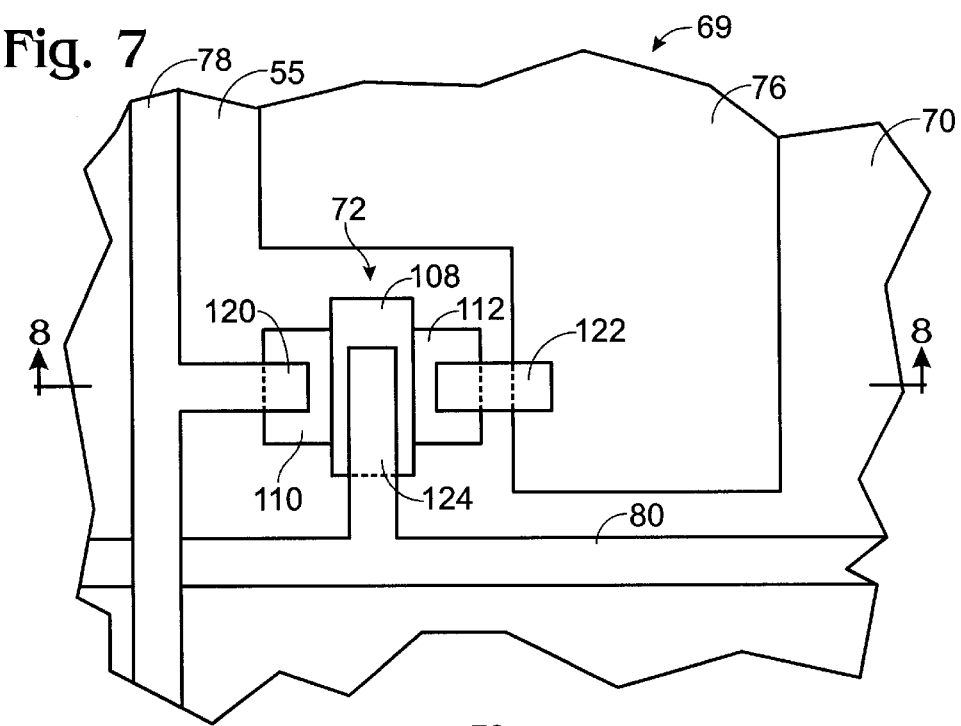
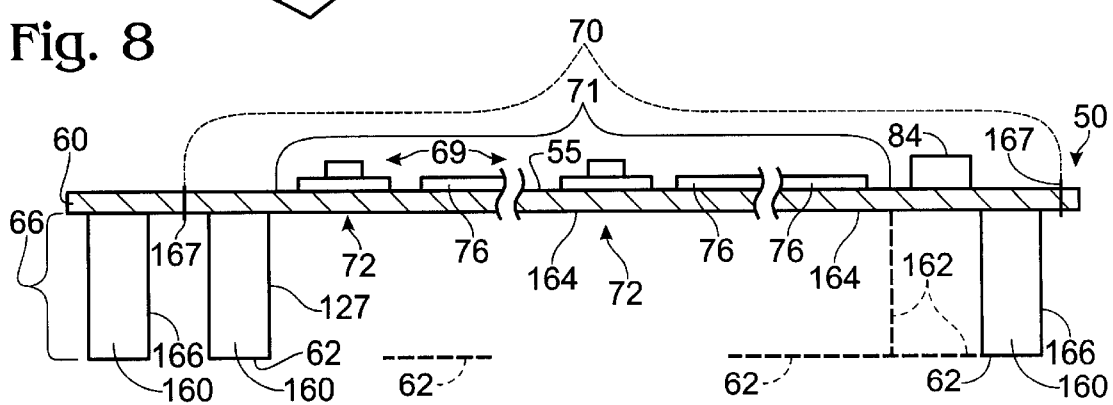

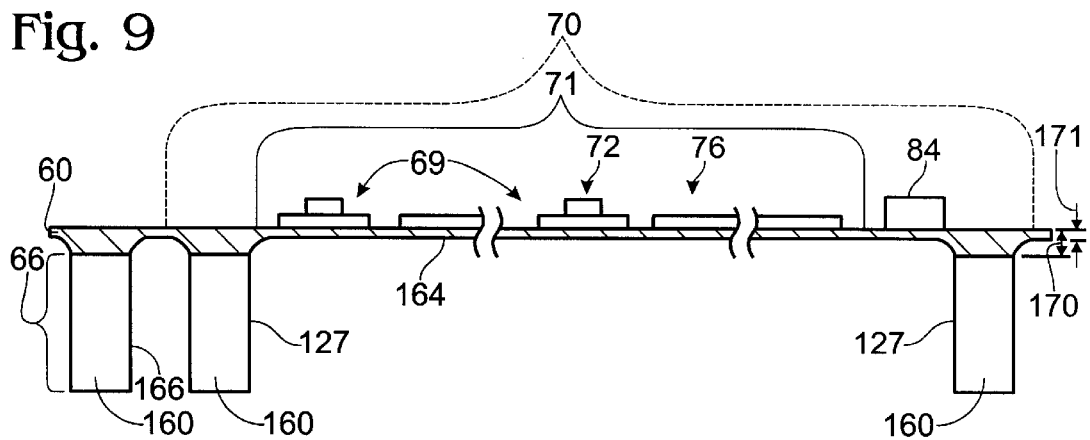
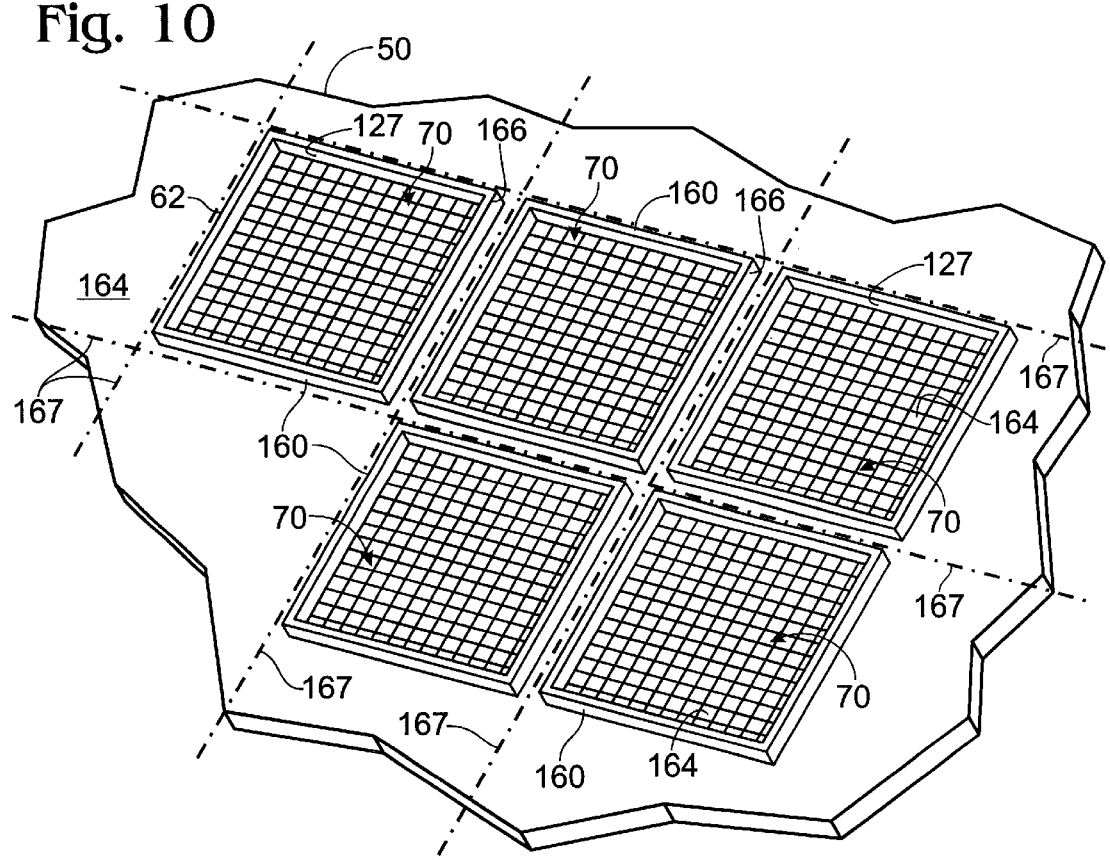

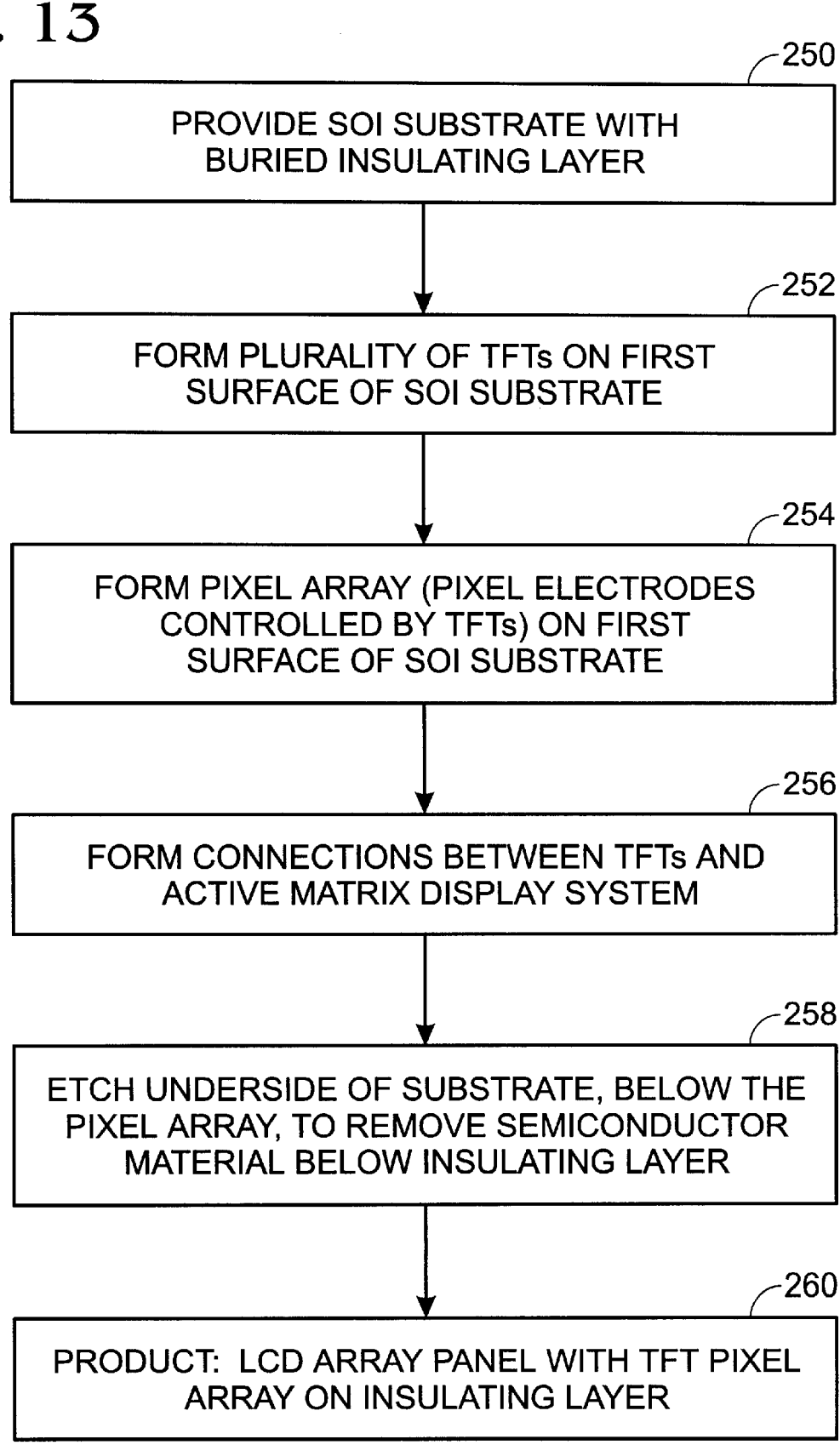

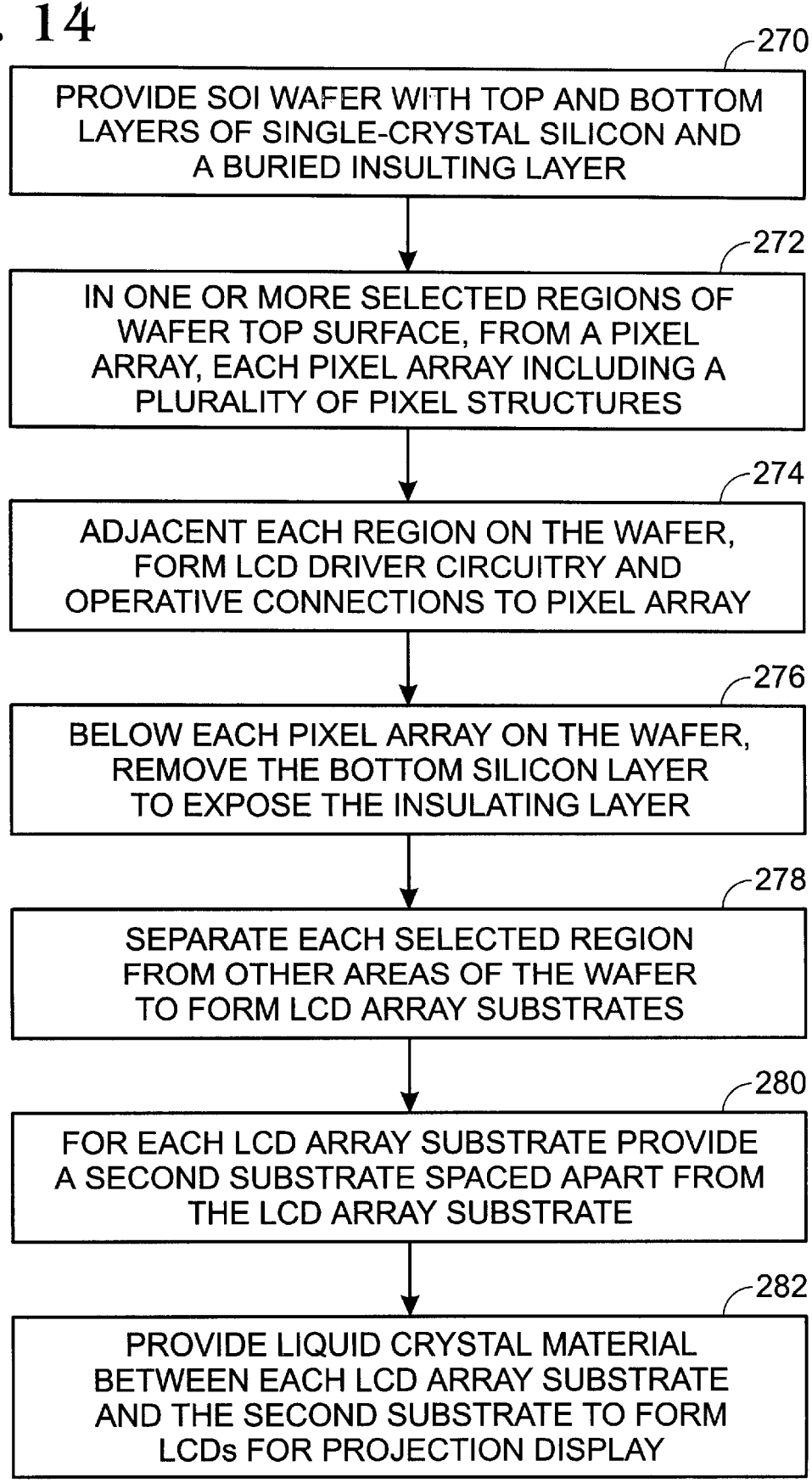

SOI TFT ARRAY SUBSTRATE FOR LCD PROJECTION DISPLAY

BACKGROUND AND SUMMARY OF THE INVENTION

The invention relates generally to liquid crystal display (LCD) panels for projection display and more particularly to a substrate structure and method of fabrication for forming high-quality thin film transistor (TFT) controlled pixel electrodes for use in LCDs.

Flat panel displays employ liquid crystal material sandwiched between parallel panels of light-transmissive material. The panels are usually made of quartz, glass, plastic, or the like. One panel has an array of pixels formed on its surface. Each pixel on the panel includes a light-transmissive pixel electrode controlled by a switching transistor. In active matrix displays the transistor, generally a thin film transistor (TFT), is operatively connected by thin metal lines on the panel to driver circuitry which selectively energizes the pixels. In active matrix displays each pixel (i.e., a pixel electrode controlled by a TFT) is addressed and controlled individually.

Light directed through the LCD passes through a first polarizing filter applied to one of the two parallel panels. The other panel has a second polarizing filter oriented in a different direction from the first. The liquid crystal material, which fills the volume between the panels, contains molecules which rotate the incident light in a well-defined manner when the adjacent pixel electrode is energized. Typically, the LCD is configured so that a particular pixel, when turned on, rotates the polarized light as it passes through the liquid crystal material, causing it to pass through the second polarizing filter. When the pixel is turned off, the polarized light is not rotated and thus will not pass through the second polarizer. An array of pixels turned on or off in a predetermined order and pattern produces images. By using multiple color filters, and given a sufficient density of pixels, full-color images are produced on the LCD screen. In projection-type LCDs light is directed through the LCD and is projected onto a screen.

Forming LCDs is a manufacturing challenge because a high density of pixels must be formed on a large area of transparent or translucent flat panel material. The pixels (TFTs and pixel electrodes) are fabricated in a layer of silicon applied to a quartz, glass, or another substrate (referred to herein after as the "transparent substrate"). The form of silicon that is easiest to apply to transparent substrates is uncrystallized amorphous silicon, which is widely used in LCD panels. Amorphous silicon yields poor TFT performance because of low electron mobility, but it is adequate for active matrix pixel control in most applications. TFTs formed in amorphous silicon lack the frequency response for display driver circuitry, however. The driver circuitry must be fabricated separately, usually as integrated circuits formed in single-crystal silicon. The separately-formed drivers must then be connected to the LCD, increasing manufacturing costs.

Polycrystalline silicon can be formed on a transparent substrate, as an alternative to amorphous silicon, by partially crystallizing deposited amorphous silicon through heating. Polycrystalline silicon (also known as polysilicon) yields higher-quality TFTs, but the high process temperatures required to crystallize amorphous silicon presents major difficulties, particularly for glass and plastic substrates. Heat sufficient to produce crystallized silicon on a transparent substrate can damage the substrate. Therefore, LCD manufacturers still use amorphous silicon on glass panels for the formation of the TFT pixel arrays used in LCDs. The driver circuitry, which requires a higher frequency response and better performance, is fabricated separately and connected to the panel around its periphery.

Projection-type LCDs, wherein light is directed through the LCD for projection onto a screen at a distance from the LCD, have heretofore been fabricated like direct-view LCDs. A circuit panel, with a plurality of TFT-controlled pixel electrodes formed in amorphous or partially crystallized silicon, is formed on glass or a similar transparent substrate. Liquid crystal material fills the void between the circuit panel and a second panel. Individual pixel electrodes on the circuit panel control whether or not light passes through the LCD and onto a projection screen. Suitable color filters are used to produce full-color images.

The poor performance of TFTs formed in amorphous or partially crystallized silicon is an ongoing problem for LCD manufacturers. As compared with TFTs formed in single crystal silicon (such as in IC chips), TFTs formed on transparent substrates have substantially lower electron mobility and higher leakage currents. If the TFTs used in LCD pixel arrays could be fabricated in single-crystal silicon, the result would be improved frequency response and sharper images. Single crystal silicon would also allow for reduced manufacturing costs because the fast logic required in LCD driver circuits could be integrated into the display panel. Heretofore, the only way to provide single-crystal silicon TFTs on glass is to adhere a layer of silicon, formed separately, to a glass substrate. That solution presents adhesion problems due to differing heat expansion coefficients, particularly during fabrication processing.

It would be advantageous to fabricate LCDs for projection display using single-crystal silicon strongly adhering to, and preferably integrated with, a transparent supporting layer.

It would also be advantageous to form LCD pixel arrays for projection display on a substrate which can be processed, without damage, at temperatures higher than the melting point of glass or plastic.

It would also be advantageous to have a new LCD processing system which employs silicon wafer integrated circuit processing methodologies to form high-quality TFTs and driver circuits in single-crystal silicon.

Accordingly, a liquid crystal display (LCD) array substrate is provided for use in projection-type LCDs. The LCD array substrate comprises a portion or segment of a silicon on insulator (SOI) wafer which is processed to include a first layer of substantially all single-crystal silicon on a first side of the substrate, and an insulating layer beneath the first layer. The LCD array substrate further comprises a plurality of pixel structures formed on the top single-crystal silicon layer. Each pixel structure includes a pixel electrode which, when used in a LCD, controls light transmissivity through a subregion of the LCD. Light directed to pass through the insulating layer and the pixel electrodes is, in a completed LCD structure, controlled (i.e., permitted to pass through or not pass through the LCD) by the pixel structures on the LCD array substrate.

In a preferred embodiment of the invention the SOI wafer further includes areas of a second layer of silicon on a second side of the substrate, which is on the other side of (i.e., opposite) the insulating layer from the first layer. The SOI wafer from which the LCD array substrate is made generally includes at least three layers, a top or first layer of single-crystal silicon, an intermediate layer formed of insulating material, and a bottom or second silicon layer also generally formed of single-crystal silicon. Portions of the second layer, beneath the pixel structures, have been removed to form openings in the second layer. The portions which remain cover parts of the insulating layer which extend generally around the periphery of the segment of the SOI wafer. Thus, the areas beneath the pixel structures are free of the silicon of the second layer.

In a preferred embodiment of the invention, the LCD array substrate forms part of a complete LCD array for projection display. The LCD array substrate incorporates a pixel array, which includes a plurality of thin film transistors (TFTs), wherein each TFT controls a pixel electrode. Conductors formed on the LCD array substrate provide operative connections between each TFT and a pixel controller, which is preferably an active matrix control system, the controller also being formed on the LCD array substrate. The complete LCD further includes a parallel second substrate, spaced apart from the first substrate. Liquid crystal material is placed between the LCD array substrate and the second substrate. Each pixel electrode controls the transmission of light through a subregion of the liquid crystal material in the completed LCD.

A method of forming the LCD array substrate in accordance with the present invention comprises the following steps. A SOI substrate is provided having a first semiconductor layer extending to a first side of the substrate, a second semiconductor layer extending to a second side of the substrate, and a buried insulating layer extending through the substrate. The buried insulating layer extends between and generally parallel to the first and second sides of the substrate, between the first and second semiconductor layers. In its preferred form, the silicon on insulator substrate is a wafer of single-crystal silicon into which oxygen ions are implanted in a process known as SIMOX (Separation by IMplanted OXygen). The oxygen ions are implanted at high energy and come to rest beneath the surface in a distribution pattern centered at a depth determined by the implantation energy. Following implantation, the substrate is annealed at a temperature generally in the range of 1100° C. to 1400° C. The implanted oxygen ions bond with the silicon in the substrate to form a buried layer of silicon dioxide. The annealing also repairs damage to the crystal structure of the top layer of silicon. The result is a wafer having a top layer of substantially single crystal silicon, a buried insulating layer of silicon dioxide, and a bottom bulk layer of silicon which is also substantially all single crystal silicon.

After providing a SOI substrate, the next step is to form a plurality of pixel structures in a selected area of the first semiconductor layer. Each pixel structure includes a pixel electrode, whereby, when used in a LCD, the pixel electrodes each control light transmissivity through a subregion of the LCD. In its preferred form the pixel structures each include a thin film transistor (TFT) on the first side of the substrate together with a pixel electrode which, when used in a LCD, controls the light transmissivity through a subregion of the LCD.

Another step in the method is to remove the second layer of the substrate, in a selected area of the substrate, on the opposite side of the substrate from the plurality of pixel structures, to form one or more openings in the second layer. Thus, in the selected area, the substrate includes a plurality of pixel structures on the first side supported on the insulating layer, and includes no second semiconductor layer beneath the insulating layer, the second semiconductor layer having been removed from the second side of the substrate. When the LCD array formed on the SOI substrate is used in a LCD, light passes through the body of the substrate, i.e., through the insulating layer on the bottom of the substrate, and through the pixels formed on the top of the substrate, as it is passing into and through the liquid crystal material. The light passes directly through the openings formed in the second layer and through the insulating layer. The transmissivity of light through the LCD array substrate is controlled by the pixel structures and their interaction with the liquid crystal material, in the manner well known to those skilled in the art of LCDs.

The invention is particularly directed to the formation of a TFT array for pixel control used in LCD projection displays. The TFT pixel array is formed on a substrate which is ultimately incorporated into a LCD. The preferred substrate on which the TFTs and pixel electrodes of the array are formed has a first semiconductor layer substantially comprising single-crystal silicon, a buried insulating layer, and a second semiconductor layer also substantially comprising single-crystal silicon. The TFTs and pixel electrodes are formed on the first semiconductor layer. Operative connections to the TFTs for control by an active matrix display system are also formed on the substrate. In one embodiment of the invention the active matrix control system is also formed on the first semiconductor layer of the substrate.

The semiconductor substrate, or SOI substrate, used in the method preferably has a first layer of single-crystal silicon with a thickness generally in the range of 100 Å to 5,000 Å, and a buried insulating layer of silicon dioxide with a thickness generally in the range of 500 Å to 5,000 Å. In one alternative embodiment of the method, the buried insulating layer has a beginning thickness greater than 2,500 Å and the method includes an optional step of removing a portion of the thickness of the insulating layer to reduce the final thickness of the insulating layer. The final thickness is preferably generally in the range of about 500 Å to 2000 Å. Other alternative substrates which could be used in the step of providing a suitable semiconductor substrate, within the scope of the present invention, include providing a substrate with a first semiconductor layer having a thickness generally in the range of 300 angstroms to 3000 angstroms, and a buried insulating layer of silicon dioxide having a thickness generally in the range of 1000 angstroms to 3000 angstroms. Yet another suitable substrate for use with the method of the present invention is a substrate having a buried insulating layer with a thickness greater than 500 angstroms extending between first and second semiconductor layers of substantially all single-crystal silicon.

The step of removing the second layer of the substrate from beneath the selected area of the first layer where the pixel structures are formed is preferably carried out by etching the second layer. A selective etching method, such as wet etch or plasma etch, which removes the second semiconductor layer to the level of the insulating layer, is preferred. Not all of the second layer need be removed. In the preferred embodiment of the invention a perimeter ridge of unetched silicon is left to help reinforce the mechanical integrity of the final LCD array substrate.

The LCD array of the present invention used in projection type LCDs forms part of a liquid crystal display made up of the array substrate, described above, formed in accordance with the above-described method, together with a second substrate. The two parallel substrates are spaced apart with liquid crystal material disposed between the substrates to form a LCD. An important aspect of the present invention is that the method allows a plurality of LCD array substrates to be formed simultaneously on a SOI wafer using integrated circuit (IC) processing techniques.

An alternative embodiment method included within the scope of the present invention is the formation of one or more LCD arrays on a wafer by steps which include providing a wafer of substantially single-crystal silicon having a buried insulating layer. Then, in one or more regions of the wafer, on the top silicon layer, forming a pixel array made up of a plurality of pixel structures. In each region on the wafer a LCD driver and operative connections between the driver and the pixel structures are then formed, providing an operative pixel array. An additional step is the removal, from the other side of the wafer in each of the regions where the pixel arrays and LCD drivers are formed, substantially all of the bottom silicon layer from beneath the pixel structures. As a result, the wafer cross section where the pixel structures are formed consists of the top layer with the pixel structures formed thereon, and the insulating layer. Then a step is carried out of separating, from other areas of the wafer, each of the regions where a pixel array, the LCD driver, and connections are formed. Each region thereby becomes a separate LCD array substrate, alternatively referred to herein as a first substrate of a LCD. The one or more LCD array substrates thus formed, are then each combined with a second substrate which is provided spaced apart from the first substrate. For each of the first and second substrates spaced apart from one another, the next step is to provide liquid crystal material between the substrates to form one or more LCDs. In each LCD the second substrate operates cooperatively with the LCD array on the first substrate to control light transmission through the first and second substrates and through subregions of the liquid crystal material. The result is a plurality of projection-type LCDs, each providing selective control of light transmission through subregions of the LCD to control a projection display. The pixel array substrates for the plurality of LCDs are fabricated simultaneously on a SOI wafer using IC processing methodologies, greatly reducing manufacturing costs for projection-type LCDs.

BRIEF DESCRIPTIONS OF THE DRAWINGS

FIGS. 5 and 6 are partial cross-sectional views showing steps in the fabrication sequence for forming a LCD array on a SOI substrate in accordance with the method of the present invention.

FIG. 7 is a partial plan view of a pixel structure and conductors formed on a SOI substrate.

FIG. 8 is a partial cross-sectional view, in part taken along line 8—8 of FIG. 7, showing a portion of a LCD substrate after removal of the bottom semiconductor layer from beneath the pixel array of the substrate.

FIG. 9 is a partial cross-sectional view as in FIG. 8 showing the LCD array substrate formed using an alternative etching methodology within the scope of the present invention wherein the insulating layer is partially etched after the removal of the second semiconductor layer.

FIG. 10 is a partial perspective view of a wafer, as in FIG. 2, showing the second or bottom side of the wafer, following the step of removing the second semiconductor layer from the underside of selected areas on the wafer to form openings in the second semiconductor layer and perimeter ridges around selected areas on the wafer.

FIG. 13 shows the steps in an alternative embodiment of the method of FIG. 12, wherein the pixel array on the LCD array panel is made up of pixel electrodes controlled by TFTs.

FIG. 14 shows the steps in another alternative embodiment of the method in which one or more LCD array substrates are formed on a SOI wafer to produce one or more LCDs for projection display.

DETAILED DESCRIPTION OF THE PREFERRED EMBODIMENT

The present invention relates to liquid crystal display (LCD) assemblies of the type that are particularly adapted for projecting images on a screen. Such LCDs comprise several parts, some of the elements being illustrated in FIG. 1, which is a partially exploded schematic view. LCDs have two parallel substrates, alternatively referred to herein as panels. A first substrate 20 has an organized array of pixel elements described below which control light transmission through subregions of the LCD. The second substrate 30, sometimes called the common panel, is a transparent substrate for enclosing the liquid crystal material that fills the void between the first and second substrates 20, 30, respectively. The liquid crystal material (not shown) which fills the area between the panels 20, 30 is of any type suitable for use in LCDs.

First substrate 20 includes a large plurality of pixel structures which, in an active matrix LCD, are individually addressable. Examples of some pixel display formats in use include VGA (640 horizontal pixel rows×480 vertical pixel columns); XGA (1024×768); SXGA (1280×1024); and UXGA (1600×1280). Color displays use triple the number of pixels. Each pixel structure includes a pixel electrode formed of a transparent conductive material such as indium tin oxide (ITO). The pixel electrode is selectively energized to control light transmission through the adjacent liquid crystal material in an assembled LCD, as is well known in the art. In addition to the pixel electrodes formed on substrate 20 a plurality of thin film transistor (TFTs) are provided to switch the pixel electrodes on or off. Conductive interconnections are also provided on the substrate.

Figure 1:
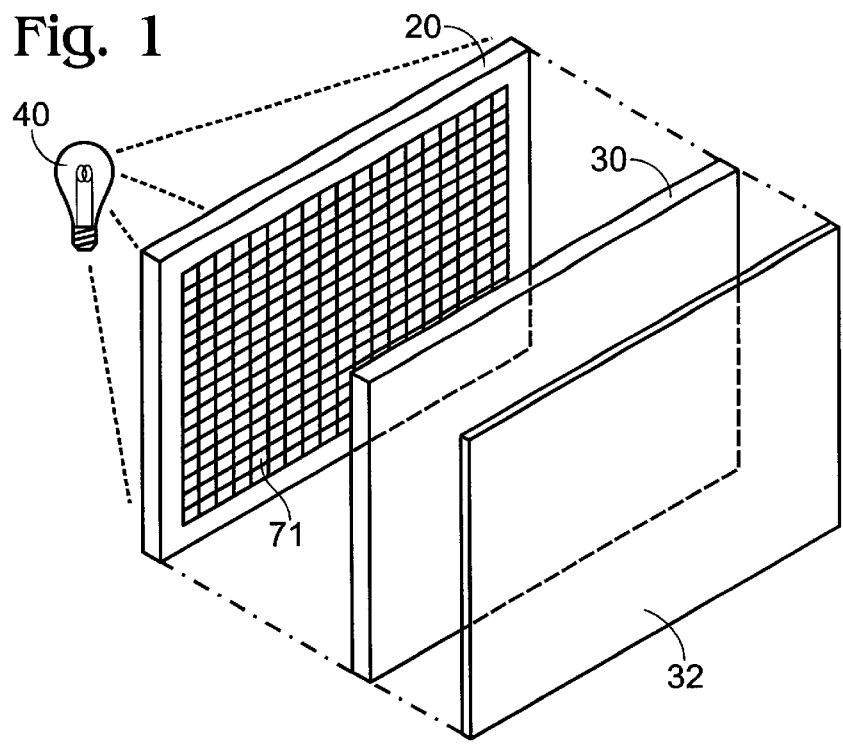
FIG. 1 is an exploded perspective view of the parts of a projection-type liquid crystal display (LCD) in accordance with the present invention.

The present invention provides a very high pixel density LCD array substrate and a fabrication method. The LCD array substrate (20 in FIG. 1) is used in projection-type LCDs. In such LCDs light from a suitable source 40 is directed through the TFT array substrate 20, through the liquid crystal material (not shown), the common substrate 30, and any filters 32 before emerging (at the right end in FIG. 1) for projection onto a screen. The pixels on substrate 20 control the projected image by determining where light passes and does not pass through the LCD. Substrate 20 of the present invention is alternatively referred to herein as the "first substrate," the "LCD array panel," and the "TFT array substrate." Second substrate 30 in FIG. 1, which is generally made of glass, is alternatively referred to as common substrate 30. A third parallel panel 32 shown in FIG. 1 represents one or more color filters or the like. As will be apparent to those skilled in the art of LCD panels, numerous additional layers, filters, polarizers, and the like, found in completed LCDs are omitted from FIG. 1. The present invention is particularly directed to the structure and fabrication of LCD array substrate 20, and to LCDs made therefrom.

Figure 2:
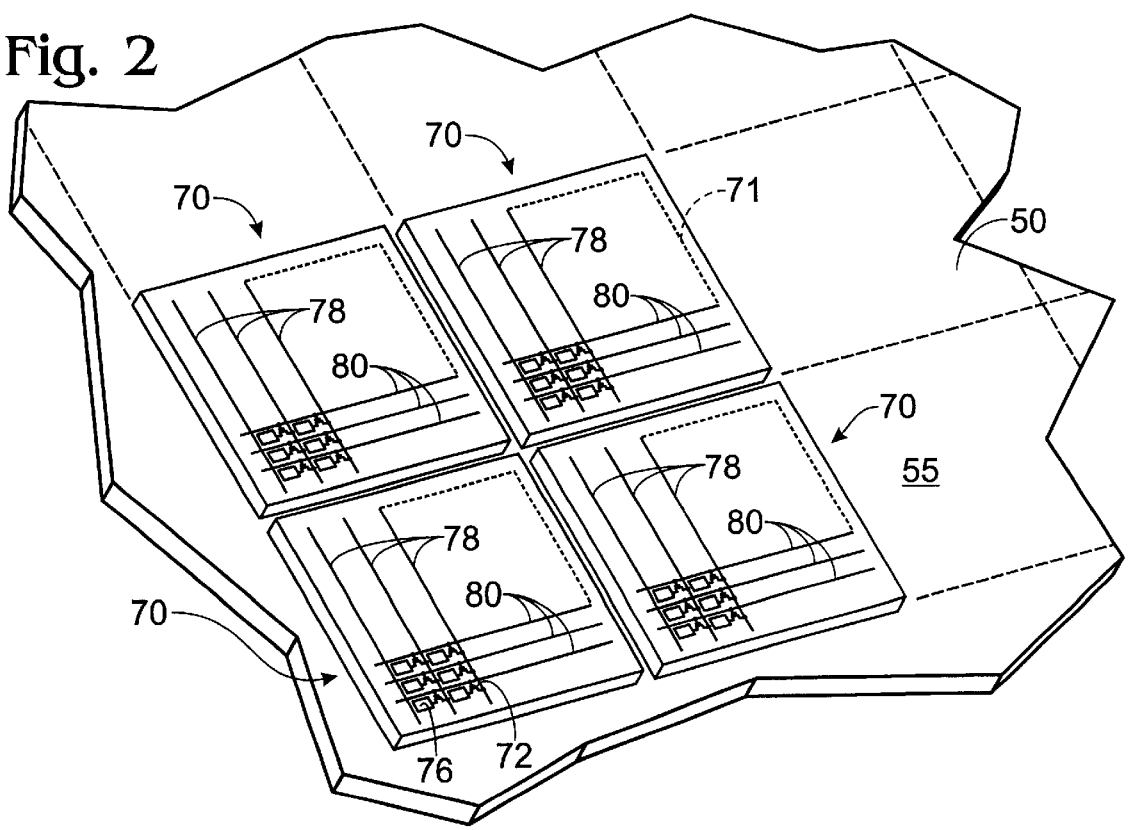
FIG. 2 is a partial perspective view of a portion of a first side of a semiconductor on insulator (SOI) wafer on which a plurality of LCD array substrates are formed in accordance with the present invention.
Figure 3:
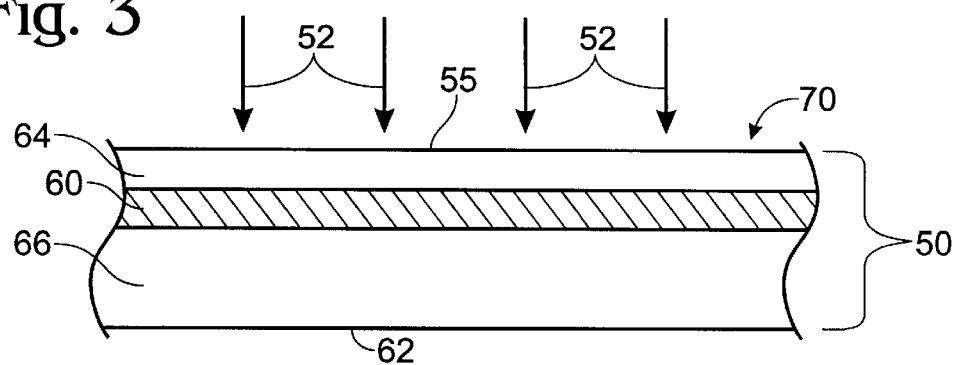
FIG. 3 is a partial cross-sectional view showing the layers in the SOI wafer of FIG. 2.

Referring to FIG. 2, a first embodiment of the invention is a method of forming one or more LCD array substrates 20 from a semiconductor on insulator (SOI) wafer 50. Such a wafer is a silicon or other semiconductor wafer of the type used in integrated circuit (IC) manufacturing which has been modified to include a buried insulating layer extending laterally through the body of the wafer. A preliminary step in the method of the present invention is to provide a semiconductor substrate having the layers shown in FIG. 3. The substrate is a single-crystal silicon wafer in which a buried insulating layer has been formed. FIG. 3 is a cross-sectional view of a portion of wafer 50 and illustrates one of several suitable methods of its fabrication. If wafer 50 is made by a process known as SIMOX (Separation by IMplanted OXygen), the wafer begins as a continuous thickness of single-crystal silicon. Oxygen ions 52 are implanted through the top surface 55 of wafer 50 at a predetermined implant energy, which controls the depth of ion implantation. Following implantation, the wafer is annealed, causing the formation of a buried layer of silicon dioxide 60 at a predetermined depth beneath the surface 55 of wafer 50. The annealing which follows oxygen implantation in the SIMOX process repairs the crystalline structure of the top layer 64 of silicon, resulting in a SOI wafer with substantially single-crystal silicon in the surface semiconductor layer. The buried layer of silicon dioxide forms an insulating layer extending through the substrate between and generally parallel to the top and bottom sides of the substrate 55, 62, respectively. The result is a wafer having three distinct layers. Examples of the details of suitable SIMOX processes for forming SOI wafer 50 are found in the background and specification of U.S. Pat. Nos. 5,436,175 and 5,468,657, which are incorporated herein by reference.

The top layer of wafer 50, sometimes referred to herein as first semiconductor layer 64, is formed substantially of single-crystal silicon. Top layer 64 extends between the top or first surface of the wafer, at top side 55, and the silicon dioxide insulating layer 60, also referred to as the buried insulating layer. A second semiconductor layer 66, also called the bottom layer, formed substantially of single-crystal silicon, extends between the bottom or second surface of the wafer, at the wafer's bottom side 62, and insulating layer 60. Buried insulating layer 60, formed of silicon dioxide, extends through the SOI substrate, separating the first and second semiconductor layers, 64, 66, respectively.

The thickness' of layers 60, 64, and 66 are selected based on the final size of the LCD array substrate 20 (FIG. 1), pixel density, operating frequency of the switching circuitry, and other factors. In the method of the present invention, the SOI wafer 50 from which the LCD array substrates are made will preferably have the following layer profile: first semiconductor layer 64 has a thickness generally in the range of 100 angstroms to 5000 angstroms; buried insulating layer 60 has a thickness generally in the range of 500 angstroms to 5000 angstroms; and bottom layer 66, a substantial portion of which is removed in the process of the invention, is not limited to any specified thickness but will generally exceed 5000 angstroms in thickness. SOI wafers can be made with top layers and buried insulating layers of any desired thickness, and the broad ranges given above are suggestive rather than limiting. It is recommended that the thickness of buried insulating layer 60 be greater than 500 angstroms to ensure that the LCD array substrate has the structural strength necessary to encapsulate liquid crystal material within an assembled LCD. A preferred thickness range for the layers on the SOI wafer, providing a single-crystal silicon layer suitable for high density pixel structures and a suitably strong insulating layer base, is as follows: a first semiconductor layer 64 with a thickness generally in the range of 300 angstroms to 3000 angstroms; and a buried insulating layer 60 with a thickness generally in the range of 1000 angstroms to 3500 angstroms.

An alternative to SIMOX can also be used to form the SOI wafers used with the present invention. One such alternative is to form a silicon on insulator wafer by depositing silicon dioxide on the surface of a silicon wafer, followed by deposition of a surface layer of silicon on the silicon dioxide. The surface silicon is then crystallized by high-temperature annealing. Other alternative methods of preparing SOI substrates will occur to those skilled in the art of integrated circuit processing. Regardless of the technique employed, SOI wafer 50 forms a larger substrate from which a plurality of smaller LCD array substrates 70 are fabricated in accordance with the present invention. The first step in the method of the present invention is to provide a SOI substrate of the type having a buried insulating layer. Such a SOI substrate is made from a portion of a wafer 50 as described above with reference to FIGS. 2 and 3.

Figure 4:
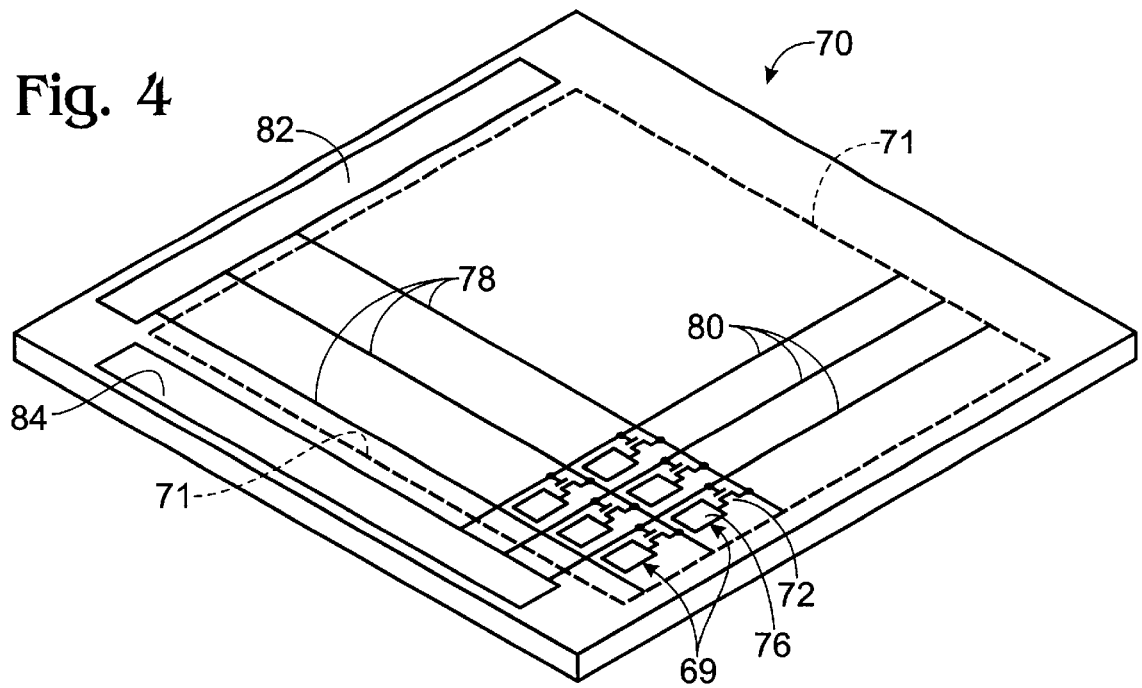
FIG. 4 is an enlarged, perspective view of a single LCD array substrate formed from a segment of the wafer of FIG. 2, the substrate having been separated from other portions of the wafer.

Returning to FIG. 2, a plurality of individual LCD array substrates 70 (20 in FIG. 1) are shown on wafer 50 during the fabrication process. The size of each substrate 70 is a matter of design choice but they will generally be small enough for more than one to be formed on a single wafer. For example, a suitable size for an individual substrate is approximately 1-inch square. A single LCD array substrate, separated from the SOI wafer after fabrication in accordance with the method of the present invention, is shown in FIG. 4.

The next step in the method of the invention is to form, on each substrate 70 of wafer 50, a plurality of pixel structures on the top single-crystal silicon layer 64 (FIG. 3). The pixel structures are indicated generally by arrows 69 in FIG. 4. Dashed line 71 in FIG. 4 outlines a selected area of the substrate where a plurality of pixel structures 69 are formed on top layer 64. The area within dashed line 71 is referred to herein as the pixel array region of the substrate and encompasses a majority of the top surface 55 of each substrate 70. Each pixel structure includes, in the preferred embodiment, a thin film transistor (TFT) 72 and a pixel electrode 76. Region 71 is alternatively referred to herein as the region where TFTs are formed on the top or first surface 55 of substrate 70. Conductive connectors 78 and 80 provide operative connections between each TFT and LCD drivers, which are shown schematically in FIG. 4 at 82, 84. The LCD drivers form part of an active matrix control system and are preferably formed on the substrate 70. The present invention is not limited to any particular pixel configuration or LCD operating system and can be used with passive matrix drivers and systems or other LCD display technologies, as well as with active matrix drivers. For illustrative purposes, the pixel connections and drivers will be assumed to employ active matrix technology.

Figure 5:
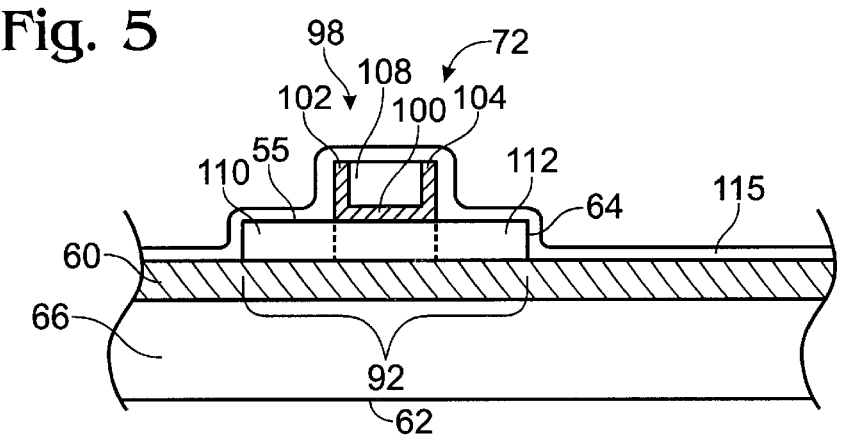

FIGS. 5–7 illustrate steps in forming the individual pixel structures in the pixel array region 71 of substrate 70. FIG. 5 shows a portion of the SOI substrate 50 in cross section after carrying out several well known preliminary steps in the forming of a representative TFT transistor 72, which is one of a large plurality of such transistors formed simultaneously on the substrate. Those steps, described with reference to FIGS. 5–7, include (1) the formation of a plurality of TFTs on the top surface 55 of substrate 70; (2) forming a plurality of pixel electrodes on top surface 55, each controlled by a TFT; and (3) forming operative connections to the TFTs such that each pixel electrode is operatively controllable by an active matrix display system 82, 84 (FIG. 4).

Beginning with substrate 70, the portions of top silicon layer 64 outside each active area 92 are removed down to oxide layer 60. Appropriate doping impurities are implanted into the remaining part of silicon layer 64 to create n-type or p-type semiconductor material. A gate structure 98 is formed centrally on active area 92. Gate structure 98 is formed by well-known photolithographic and etching steps to create a gate oxide layer 100 and sidewalls 102, 104. A gate electrode, typically formed of polycrystalline silicon or integral with gate line connectors 80 (FIG. 4), is formed at 108. Ion implantation and subsequent diffusion of dopants in silicon layer 64 forms source and drain regions 110, 112, respectively. A layer of oxide 115 is added and subsequently etched to define areas where metal conductors are applied to TFT 72.

Referring to FIG. 6, a region is defined by suitable patterning to receive a deposit of indium-tin-oxide (ITO) 76 on the surface of the substrate. ITO in a transparent conductor which becomes the pixel electrode of the device. Metal source/drain conductors 120, 122 are then added to the structure, together with a gate conductor 124. In the illustrated embodiment source conductor 120 is operatively joined to one of the parallel source lines 78 (see FIG. 4) and gate conductor 124 is operatively joined to one of the parallel gate lines 80. The drain conductor 122 operatively couples the TFT to pixel electrode 76. FIG. 7 shows a partial plan view of an individual pixel structure 69, including TFT 72, which is operatively connected to driver circuits 82, 84 (FIG. 4) by conductors 78, 80. The conductors are formed on the substrate in parallel columns and rows (see FIG. 4) and permit each pixel structure to be individually addressed.

FIGS. 8 and 9 illustrate the step in the method of the present invention of removing from the SOI substrate a portion of the second semiconductor layer 66 (FIG. 3) on the other side of the substrate from the pixel array region 71 (FIG. 4). The outline of the pixel array region is indicated at 71 in FIG. 8 (and in FIG. 4). It is the region where pixels are formed on the top 55 of the substrate. Region 71 does not include the areas of the substrate where drivers 82, 84 are formed (see FIG. 4). A representation of a driver circuit is indicated schematically at 84 in FIG. 8.

Referring to FIG. 8, the step of removing a portion of the second semiconductor layer 66, beneath pixel array region 71, is carried out by forming one or more openings 127 in the second layer of the substrate. The openings preferably extend over a substantial portion of the second or back side 62 of each substrate region 70 on the wafer 50. The openings are regions where the bottom layer silicon 66 is entirely removed, exposing the underside of the insulating layer 60. The removed area should at least cover a substantial majority of the underside of pixel array region 71 on substrate 70, to allow light to pass through the pixel structures. In the final structure of a LCD array substrate formed in accordance with the present invention, the supporting layer of the substrate, on which the TFTs, the pixel electrodes, the operative connections, and other structures are formed, is the insulating layer 60.

The step of removing substantially all of the second or bottom layer 66 from the underside 62 of pixel array region 71 on SOI wafer 50 is preferably accomplished by etching. A pattern of photoresist is formed by conventional masking techniques over the portions of bottom layer 66 which are to remain following the etching step. In the preferred form of the present invention, perimeter ridges 160 are left unetched around the periphery of the pixel array region 71 (FIG. 4) on the underside of the substrate. FIG. 8 illustrates the provision of such perimeter ridges 160 following the removal of a majority of the bottom silicon layer 66 in accordance with this step. After etching, the perimeter ridges 160 preferably extend around the periphery of each SOI substrate region 70 on the underside of the wafer 50 of FIG. 2, as shown in FIG. 10.

The width and thickness of each perimeter ridge is a matter of design choice and manufacturing optimization. The ridge 160, which is the unremoved portions of bottom substrate layer 66, extends beneath the margins of each LCD array substrate 70, outside the pixel array region 71. In other words, the opening 127 defined by ridge 160 extends beneath the pixels, so light can pass through the opening, the insulating layer 60, and the pixel structures 69 formed on the substrate. More specifically, the light must be available to pass through the pixel electrodes 76 of each pixel structure 69. Accordingly, the ridge can, but does not have to, extend beneath the driver circuitry 82, 84 (FIG. 2). FIG. 8 shows with dashed lines at 162 an optional portion of ridge 160 which could be extended beneath driver circuit 84, if desired.

The step of removing the bottom layer 66 of the substrate, except for perimeter ridges 160, is carried out by masking the areas where the perimeter ridges 160 are to remain and etching the underside of wafer 50. Suitable well-known anisotropic etch processes such as plasma etching can preferably be used to etch the silicon of bottom layer 66. Alternatively, a KOH wet etch process, which is isotropic, would be suitable for the step of removing major portions of bottom layer 66. In a first embodiment of the method, the etch is completed when, in the unmasked areas, all of bottom silicon layer 66 is removed and the underside 164 of insulating layer 60 is exposed. The etch step is preferably accomplished by inverting the wafer 50 in a suitable etch chamber, either before or after the structures are formed on top surface 55. The result of the anisotropic etch is the formation of large openings 127 where the insulating layer 60 is exposed on the underside of the wafer. Small elongated openings 166 are preferably formed between adjacent wafer substrates 70 to allow convenient separation of adjacent wafers along break lines 167 upon completion of the processing steps (see FIGS. 8 and 10).

FIG. 9 shows an alternative embodiment of the etching step of FIG. 8 wherein the etch is extended into the buried insulating layer 60 to provide a selected thickness for the insulating layer 60 which remains in the final structure. The goal of the removal step is to remove substantially all of the bottom silicon layer 66 from beneath the pixel structures 69 of each LCD array substrate 70. If the buried insulating layer 60 is thicker than is desired in the final LCD array substrate, the etch step can be used to etch partially into the insulating layer 60 to thin its cross section, as illustrated in FIG. 9. In the example of FIG. 9 the original as-formed thickness of buried insulating layer 60 is shown at 170. Following the etching of bottom silicon layer 66 to form openings 127, 166, an additional etching step is performed using an etchant suitable for etching silicon dioxide. If a wet etch is used a suitable etchant is BHF. Alternatively, the silicon dioxide of layer 60 can be etched using a plasma oxide etch. As an example of the alternative embodiment of the underside etching step shown in FIG. 9, the wafer 50 (FIG. 2) would have a buried insulating layer 60 which has a starting thickness 170 that is greater than 2500 Å thick. Following the buried insulating layer etch step, the final thickness 171 of layer 60 has been reduced to 1000 Å.

Regardless of whether or not etching is extended into buried insulating layer 60, the goal of the step of removing the second layer of the substrate 66 is to expose the underside of the buried insulating layer 60. In that way, the silicon dioxide layer can transmit light through the substrate and into and through the ITO of the pixel electrodes 76. Thus, when the LCD array substrate 70 is used in a completed LCD, the transmissivity of light directed through the openings 127 in the bottom layer 66 and through the insulating layer 60, is controlled by the pixel electrodes 76 in the manner of a LCD.

Another step in the completion of an LCD array substrate of the type shown at 20 in FIG. 1 is the separation of each of the LCD array substrate regions 70 (see FIG. 2) from the substrate regions on wafer 50. This step is preferably carried out following the formation of the TFT, pixel electrode, driver, and interconnect structures on each substrate region of the wafer. That permits a plurality of LCD substrates to be formed simultaneously on a single SOI wafer. Separation is accomplished by conventional integrated circuit manufacturing techniques well known to those skilled in the art, for example, by cutting or scoring and breaking apart the LCD array substrates along lines 167 shown in FIGS. 8 and 10. Upon separation, each substrate region 70 becomes a separate SOI substrate and includes a perimeter ridge 160 on its second or under side, which improves the structural integrity of the substrate. While the perimeter ridges 160 are shown as comparatively narrow structures in the figures, the final dimensions of the perimeter ridges is selectable following experimentation during manufacturing and production.

Figure 11:
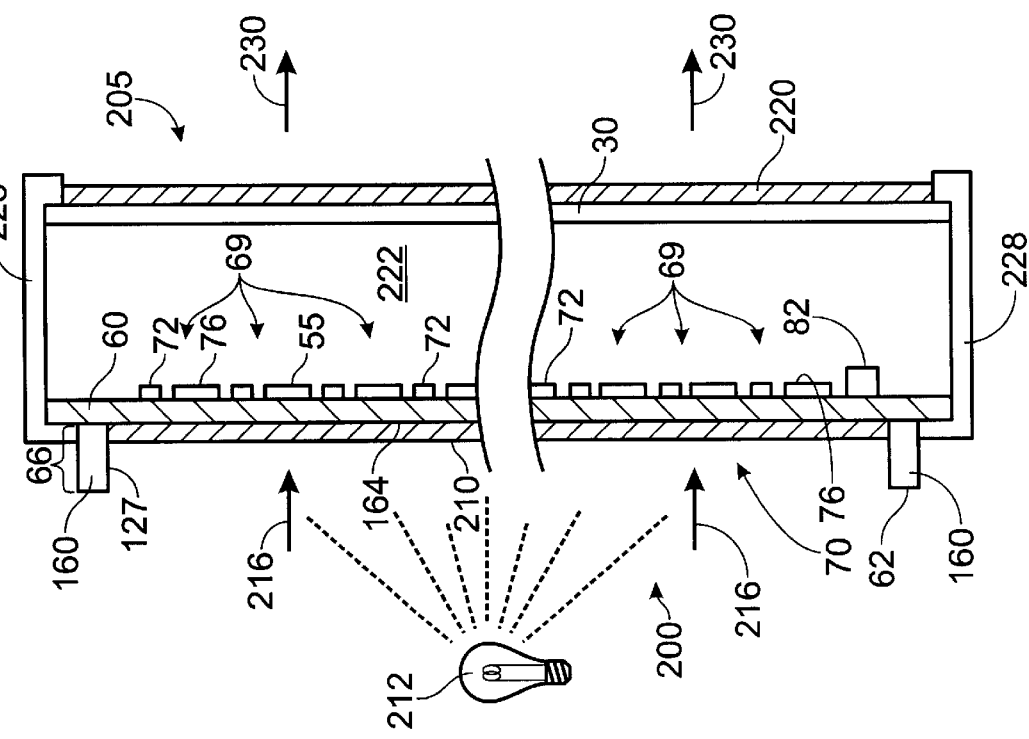
FIG. 11 is a partial schematic, cross-sectional view of an assembled projection-type LCD in accordance with the present invention.

A completed liquid crystal display (LCD) for projection display, using the LCD array substrate of the present invention, is shown in FIG. 11. A partial cross sectional view of a single LCD array substrate 200, consisting of a single completed substrate (indicated at 70 in FIGS. 2 and 8), forms one side or surface of the LCD. LCD array substrate 200 in FIG. 11 forms one panel of a completed projection-type LCD 205. Substrate 200 includes buried insulating layer 60 and the perimeter ridges 160 on the underside of the substrate. LCD array substrate 200 is equivalent to substrate 20 in FIG. 1. On the first side 55 of substrate 200, facing toward the interior of LCD 205, are a plurality of pixel arrays 69, each including a TFT 72 and pixel electrode 76. One of the LCD driver circuits 82 is also shown on substrate 200. Most of the bottom silicon layer 66 has been removed to form bottom opening 127, surrounded by perimeter ridges 160. The underside of insulating layer 60 is coated with a first polarizing filter 210, which polarizes light from an external source 212 as it enters the LCD in the direction of arrows 216.

The opposite side of LCD 205 is enclosed by common substrate 30, as shown and described with reference to FIG. 1. Common substrate 30 is coated with a second polarizing filter layer 220 which polarizes the light in a second direction different from that provided by first polarizing filter 210. Between the substrates 200, 30 is disposed liquid crystal material 222 of any suitable type used in liquid crystal displays. Perimeter enclosures 228 form a border around LCD 205, holding the panels 200, 30 in parallel orientation and enclosing the liquid crystal material 222.

In operation, LCD 205 controls the light from an external source 212, which enters the LCD through insulating layer 60 of substrate 200. Layer 60, which is predominately silicon dioxide, is transparent and supports the pixel arrays 69 formed on its inner (i.e., top) surface 55. As will be appreciated, there is no glass panel or other separate substrate supporting the pixel structure 69 other than insulating layer 60. The light, which is polarized by filter 210, passes through the array of pixel electrodes 76. Assuming the electrodes 76 are configured to cause the liquid crystal material 222 adjacent the electrode to rotate the light to correspond with filter 220, light in the vicinity of a pixel which is turned on will pass directly through LCD 205. When a pixel is turned off, the incident light passing through an electrode 76 is not rotated and will not emerge through second polarizer 220. Alternatively, the LCD could be configured so the first and second polarizers 210, 220, respectively, are aligned with one another. In such an LCD, incident light will pass through the LCD whenever the polarized light is not rotated by the liquid crystal material. As such, the light will pass through each subregion of the LCD when the adjacent pixel electrode is turned "off" and will be blocked from passing through when the adjacent pixel electrode is turned "on." In either configuration (aligned or nonaligned polarizers 210, 220), both configurations being within the scope of the present invention, the state of individual pixels determines the pattern of light and dark spots on the display. By controlling the pattern of pixels which are turned either "on" or "off" the pattern of light emerging through the other side of LCD 205, in the direction of arrows 230, is controlled by the LCD.

Figure 12:
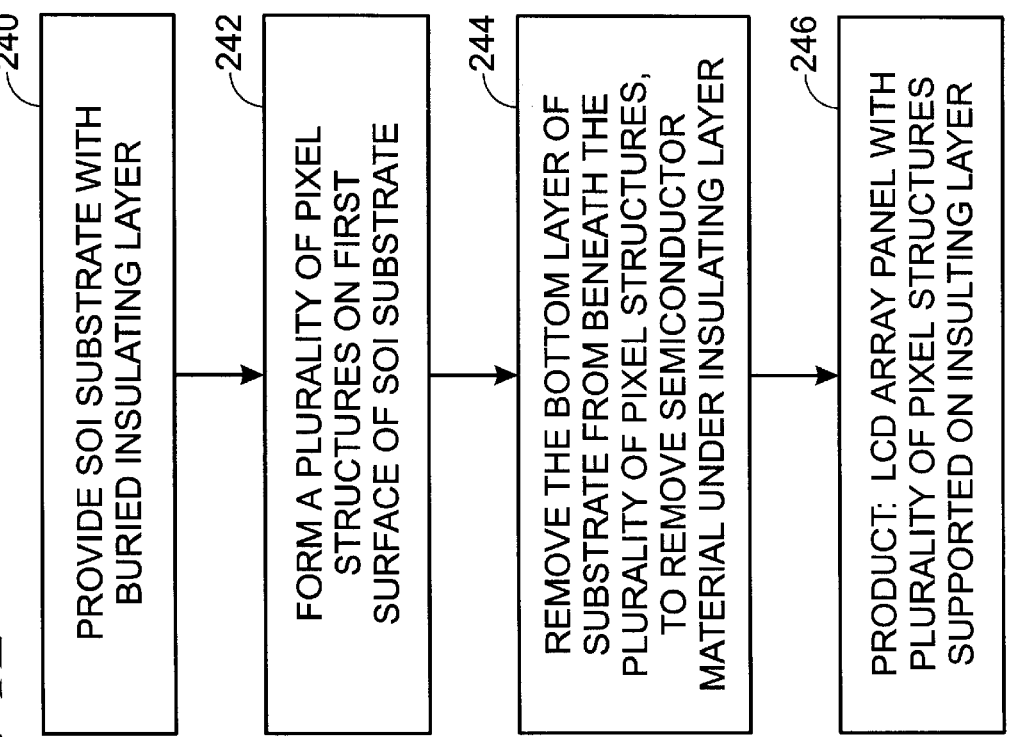
FIG. 12 shows the steps in the method of forming a LCD array panel for use in projection-type LCDs in accordance with the method of the present invention.

FIGS. 12–14 illustrate steps in various embodiments of the method of the present invention. Referring first to FIG. 12, the method of forming a liquid crystal display (LCD) array for a projection display, such as the completed array substrate 200 shown in FIG. 11 and described in detail with reference to FIGS. 2–10, begins with the step 240 of providing an SOI substrate having a buried insulating layer. The substrate is the 3-layer substrate 70 shown and described with reference to FIG. 3 and preferably forms part of an SOI wafer 50, as shown in FIG. 2. Step 242 is the formation of a plurality of pixel structures in a selected area on a first surface 55 (FIG. 3), of substrate 70. The selected area referred to on each substrate region 70 is the area 71 enclosed with dashed lines in FIG. 4. The next step, 244, is the removal of the bottom layer 66 (FIG. 3), of the substrate from the beneath the selected area 71, (see FIGS. 4 and 8), under the area where the plurality of pixel structures are formed. This step removes the semiconductor material of bottom layer 66 from under insulating layer 60, leaving only perimeter ridges 160, as shown in FIGS. 8–11. The removal of the majority of layer 66 beneath the pixel structures 69 exposes the underside 164 of insulating layer 60, allowing light to pass through the insulating layer. As such, step 244 forms openings 127 (See FIGS. 8 and 10), on the underside of the LCD array substrate. The result is that, in the selected area 71 where the pixel structures are formed, on the opposite side of the substrate from the pixel structures, the second semiconductor layer 66 is substantially removed. The product of the invention, at step 246, is an LCD array substrate which forms one panel 200 of an LCD 205 (See FIG. 11). The panel includes a plurality of pixel structures 69 supported on the buried insulating layer 60.

FIG. 13 illustrates, in greater detail, some of the steps shown and described with reference to FIG. 12. Step 250 is the same as Step 240 in FIG. 12, providing a substrate with a buried insulating layer. Step 252 is the formation of a plurality of TFTs 72 (FIG. 4) on first surface 55 of substrate 70. Step 254 is the completion of a pixel array on first surface 55 of substrate 70, the pixel array consisting of a plurality of pixel electrode 76 controlled by the plurality of TFTs 72 formed in step 252. The next step 256 is the formation of operative interconnections 78, 80 (in FIG. 4)

between the TFTs 72 and the display control circuitry 82, 84, preferably also formed on first surface 55 of substrate 70. The connections formed in step 256 preferably include a grid pattern of narrow metal conductive lines formed on the top surface 55 of substrate 70. Steps 252, 254, and 256 are carried out as part of the fabrication sequence, which employs photolithographic and deposition processes of the type used in integrated circuit manufacturing.

The next step 258 is the etching of the underside 62 of each substrate 70 on which the various TFTs, pixel electrodes, conductive lines and driver circuitry have been formed on first side 55. The etching step 258, illustrated and described with reference to FIGS. 8, 9, and 10, removes the semiconductor material of layer 66 below the pixel array region enclosed by dashed line 71 in FIG. 4. Step 258 exposes the underside of 164 of buried insulating layer 60. Etch step 258 also preferably is used to form narrow separation channels 166 between the perimeter ridges 160 of adjacent LCD substrates. The product 260 is a LCD array panel like panel 200 in FIG. 11. The panel includes a TFT pixel array formed on insulating layer 60.

FIG. 14 shows the steps in a preferred embodiment of the present invention wherein a plurality of LCD array substrates 200 (FIG. 11), are formed substantially simultaneously on a SOI wafer 50 (FIG. 2). The first step 270 in the embodiment of FIG. 14 is to provide a silicon-on-insulator (SOI) wafer, having top and bottom layers on single crystal silicon (layers 64, 66, respectively, in FIG. 3), and a buried insulating layer 60 extending therebetween. A plurality of LCD arrays are formed on the 3-layer substrate by the following: In step 272, a pixel array is formed in one or more selected regions of the top surface of the wafer, the regions being indicated within the dashed lines 71 (FIG. 4) in each substrate region 70 on wafer 50 in FIG. 2. The pixel array regions 71 encompass a majority of each substrate region 70 on wafer 50. In step 274, LCD driver circuitry (82, 84 in FIG. 4), is formed adjacent each pixel array region 71 on the wafer. Step 274 also includes the formation of operative connections 78, 80 between the array of pixels 69 (including TFTs 72 and pixel electrodes 76) and driver circuitry 82, 84. Step 276 is the removal of the bottom silicon layer below each pixel array region 71, which removes substantially all of the bottom silicon layer from beneath the pixel structures 69 on each LCD array. This exposes the underside 164 of insulating layer 60, as shown in FIG. 8. The next step 278 is the separation of each selected SOI substrate region 70 from other areas of wafer 50 (FIG. 2), generally along the lines indicated at 167 in FIGS. 8 and 10.

Step 280 is part of the assembly of a complete LCD 205 as shown in FIG. 11. For each LCD array substrate 200 formed in accordance with the previously-described steps of FIG. 14, the step includes providing a second substrate 30 spaced apart from substrate 200. Finally, in step 282, liquid crystal material 222 is provided between each LCD array substrate 200 and a second substrate, also referred to as the common substrate, 30. The result is the formation of a plurality of LCDs for projection display.

Because the invention employs a well-known ULSI (Ultra Large Scale Integration) integrated circuit fabrication techniques, forming TFTs and other devices in single-crystal silicon, extremely high pixel densities are achievable with the present invention. Suitable optics allow for large-size projection of images from even the smallest pixel format.

Alternative embodiments are possible within the scope of the present invention. The specified details for forming the SOI substrate are suggestive only and other methods of forming suitable SOI substrates for use with the present invention will occur to those skilled in the art. While the illustrated embodiment shows a plurality of LCD substrates being formed on a single wafer, each LCD array substrate could be made large enough to encompass substantially all of a single SOI wafer. If a substantially larger LCD array substrate is formed by the method of the present invention, it may be necessary to adjust the thickness' of the top, bottom, and buried insulating layers, for example, by increasing the thickness of the buried insulating layer. The perimeter ridge on the underside of each LCD array substrate is optional and could be eliminated altogether. Alternatively, additional supporting ribs or ridges could be provided on the underside of the substrate if sufficient numbers and sizes of openings are formed to allow light to pass through the supporting insulating layer. While the method of the present invention specifies separating individual substrates from the SOI wafer following the fabrication steps for forming the TFTs, pixel arrays, and interconnects, the production sequence could be altered to separate the individual substrates from a larger wafer prior to forming the active elements and interconnects on the top surface of the substrate. Also, the present invention could be readily employed in manufacturing direct-view LCDs, particularly LCDs of small size. Direct-view LCDs of larger sizes could be made in accordance with the method of the present invention if SOI substrates of sufficient size are provided. Other alternative embodiments of the present invention will occur to those skilled in the art.

What is claimed is:

1. A method of forming liquid crystal displays (LCDs) for projection display, comprising:

forming, on a wafer of substantially single-crystal silicon which includes a buried insulating layer extending between top and bottom layer of silicon, one or more LCD arrays, the LCD arrays being formed on the wafer by steps which include:

in each of one or more regions of the wafer, forming a pixel array including a plurality of pixel structures each of which selectively controls light transmissivity through a subregion of a LCD; and in each said region of the wafer, forming a LCD driver and operative connections between the driver and said pixel structures; and;

on the other side of the wafer in each said region, removing substantially all of the bottom silicon layer from beneath the pixel structures, whereby the wafer cross section where the pixel structures are formed consists of said top layer with the pixel structures formed thereon, and said buried insulating layer;

removing a portion of the buried insulating layer to select a final thickness for the buried insulating layer;

separating each said region from other areas of the wafer, each said region forming a first substrate of the LCD;

for each said first substrate formed, providing a second substrate spaced apart from said first substrate; and providing liquid crystal material between the first and second substrates to form one or more LCDs, in each LCD said second substrate operating cooperatively with the LCD array on said first substrate to control light transmission through said first and second substrates and through subregions of the liquid crystal material, whereby selective control of light transmission through subregions of the LCD controls the projection display.

2. A method of forming a thin-film-transistor (TFT) array substrate for a LCD projection display, comprising:

providing a semiconductor substrate which is a SOI substrate that is a wafer of substantially single crystal silicon having opposed first and second major surfaces and having a buried insulating layer extending between and generally parallel to said first and second major surfaces, said substrate including a first semiconductor layer extending between the buried silicon dioxide layer and said first major surface and a second semiconductor layer extending between the buried silicon dioxide layer and said second major surface, said step of providing a semiconductor substrate including providing a SOI substrate in which said buried insulating layer has a thickness greater than 2500 Å;

forming a plurality of TFTs on a first surface of the substrate;

forming a plurality of pixel electrodes on the first surface, each pixel electrode being controlled by a TFT;

forming operative connections to each TFT such that each pixel electrode is operatively controllable by an active matrix display system coupled to said TFTs via said operative connections;

removing one or more areas of said second semiconductor layer of the substrate below said buried insulating layer, between the second major surface and said buried insulating layer, in the region where said TFTs are formed on said first surface, whereby, in said region, the substrate includes said first surface on which said TFTs, pixel electrodes, and operative connections are formed, supported on said insulating layer, said step of removing the second layer of the substrate on the opposite side of the substrate from said first layer further includes removing a portion of the thickness of said insulating layer to reduce the thickness of said insulating layer to between about 500 Å and 2000 Å.

3. A method of forming a liquid crystal display (LCD) array for a projection display LCD, comprising providing a silicon on insulator (SOI) substrate which is a substantially single crystal silicon wafer having a buried insulating layer, including a first semiconductor layer extending to a first side of the substrate, a second semiconductor layer extending to a second side of the substrate, and a buried insulating layer extending through the substrate between and generally parallel to said first and second sides, said buried insulating layer having a thickness greater than 2500 Å;

in a selected area of the substrate on said first side, forming a plurality of pixel structures, each pixel structure including a pixel electrode. whereby, when used in a LCD, the pixel electrodes each control the light transmissivity through a subregion of the LCD;

in said selected area, on the opposite side of the substrate, removing portions of the second layer of the substrate to form one or more openings in the second layer, said step of removing the second layer to form one or more openings including removing all of the silicon from said second layer such that in said selected area the substrate includes a plurality of pixel structures on said first side supported on the insulating layer, the second semiconductor layer having been removed from said second side, whereby, when the LCD array is used in a LCD, the transmissivity of light directed through said opening and passing through the insulating layer is controlled by the pixel electrodes of said pixel structure; and said step of removing the second layer to form one or more openings in the second layer of the substrate on the opposite side of the substrate from said first layer further including removing a portion of the thickness of said insulating layer, whereby the thickness of said insulating layer is reduced.

4. A method of forming a thin-film-transistor (TFT) array substrate for a LCD projection display, comprising:

providing a semiconductor substrate having opposed first and second major surfaces and having a buried insulating layer extending between and generally parallel to said first and second major surfaces, in which said substrate is a substantially single crystal silicon wafer and said buried insulating layer is a layer of silicon dioxide, said substrate including a first layer extending between the buried silicon dioxide layer and said first major surface and a second layer extending between the buried silicon dioxide layer and said second major surface and wherein said first layer has a thickness generally in the range of 300 Å to 3000 Å and said buried insulating layer of silicon dioxide has a thickness generally in the range of 1000 Å to 3500 Å;

forming a plurality of TFTs on a first surface of the substrate, forming a plurality of pixel electrodes on the first surface, each pixel electrode being controlled by a TFT;

forming operative connections to each TFT such that each pixel electrode is operatively controllable by an active matrix display system coupled to said TFTs via said operative connections;

removing one or more areas of said semiconductor substrate below said buried insulating layer, between the second major surface and said buried insulating layer, in the region where said TFTs are formed on said first surface, whereby, in said region, the substrate includes said first surface on which said TFTs, pixel electrodes, and operative connections are formed, supported on said insulating layer.

5. A liquid crystal display (LCD) array substrate for use in a projection-type LCD, the LCD array substrate comprising:

a segment of a silicon on insulator (SOI) wafer which includes a first layer of substantially all single-crystal silicon on a first side of the substrate, said first layer having a has a thickness generally in the range of 500 Å to 2000 Å, and including an insulating layer beneath said first layer, said insulating layer having a thickness generally in the range of 1000 Å to 3500 Å; and a plurality of pixel structures formed on a LCD array region of said first layer, each pixel structure including a pixel electrode which, when used in a LCD, controls light transmissivity through a subregion of a LCD;

LCD driver circuitry formed on said first layer the substrate 70 on first single-crystal silicon layer 64, as such, the drivers 82, 84 are formed on the same substrate as the LCD pixels 69 in pixel array region 71, on the first surface 55 of the substrate, and;

wherein substantially all silicon located beneath said insulating layer, on the opposite side of the insulating layer from said first layer of silicon, has been removed from the substrate such that the segment of SOI wafer the layers includes said first layer, together with said pixel structures and said LCD driver circuitry formed on said first layer, and said insulating layer.

* * * * *